(12) United States Patent
Arai

(10) Patent No.: US 11,902,713 B2
(45) Date of Patent: Feb. 13, 2024

(54) PROJECTION SYSTEM, PROJECTION METHOD, AND STORAGE MEDIUM

(71) Applicant: CASIO COMPUTER CO., LTD., Tokyo (JP)

(72) Inventor: Toshiharu Arai, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 217 days.

(21) Appl. No.: 17/475,444

(22) Filed: Sep. 15, 2021

(65) Prior Publication Data

US 2022/0094888 A1    Mar. 24, 2022

(30) Foreign Application Priority Data

Sep. 24, 2020 (JP) ................................ 2020-159510

(51) Int. Cl.
*H04N 9/31* (2006.01)
*G08B 5/22* (2006.01)
*G08B 3/10* (2006.01)
*G06F 3/14* (2006.01)

(52) U.S. Cl.
CPC ................. *H04N 9/31* (2013.01); *G06F 3/14* (2013.01); *G08B 3/10* (2013.01); *G08B 5/22* (2013.01)

(58) Field of Classification Search
CPC .... H04N 9/31; G06F 3/14; G08B 3/10; G08B 5/22
USPC .......................................................... 348/744
See application file for complete search history.

(56) References Cited

U.S. PATENT DOCUMENTS

| 7,197,562 B2* | 3/2007 | Murtha ................... H04L 67/02 709/224 |
| 7,944,421 B2* | 5/2011 | Inazumi ................. G09G 5/003 353/30 |
| 2007/0266094 A1* | 11/2007 | Chang ................... G06Q 10/10 709/204 |

(Continued)

FOREIGN PATENT DOCUMENTS

| JP | H1131030 A | 2/1999 |
| JP | 2005285087 A | 10/2005 |

(Continued)

OTHER PUBLICATIONS

Notice of Reasons for Refusal dated Jan. 31, 2023 received in Japanese Patent Application No. JP 2020-159510.

(Continued)

*Primary Examiner* — John W Miller
*Assistant Examiner* — Omer Khalid
(74) *Attorney, Agent, or Firm* — Scully, Scott, Murphy & Presser, P.C.

(57) ABSTRACT

There is provided a projection system including: a projector configured to project an image on a projection surface; and a computer configured to communicate with the projector and instruct the projector to project the image in accordance with an operation by a user. The projector includes a first processor that sends information on an operation state of the projector to the computer while communicating with the computer. The computer includes a display and/or a speaker and a second processor that makes a notification based on the information from the projector by causing the display to display a notification and/or by causing the speaker to output a voice.

11 Claims, 5 Drawing Sheets

(56) References Cited

U.S. PATENT DOCUMENTS

2010/0060803 A1* 3/2010 Slack .................... H04N 7/142
353/121
2010/0247076 A1* 9/2010 Ide ......................... G06F 3/14
386/263

FOREIGN PATENT DOCUMENTS

| | | | |
|---|---|---|---|
| JP | 2006308934 A | | 11/2006 |
| JP | 2008046364 A | * | 2/2008 |
| JP | 2008046364 A | | 2/2008 |
| JP | 2008152625 A | | 7/2008 |
| JP | 2008-271265 A | | 11/2008 |
| JP | 2010-066776 A | | 3/2010 |
| JP | 2012160020 A | | 8/2012 |
| JP | 2016071606 A | | 5/2016 |
| JP | 2016-145871 A | | 8/2016 |
| JP | 2018055409 A | | 4/2018 |
| JP | 2019-041210 A | | 3/2019 |
| JP | 2020038424 A | | 3/2020 |
| WO | 2011096423 A1 | | 8/2011 |

OTHER PUBLICATIONS

Notice of Reasons for Refusal dated Oct. 11, 2022 received in Japanese Patent Application No. JP 2020-159510.
Decision of Dismissal of Amendment dated May 23, 2023 received in Japanese Patent Application No. JP 2020-159510.
Decision of Refusal dated May 23, 2023 received in Japanese Patent Application No. JP 2020-159510.

* cited by examiner

PROJECTION SYSTEM, PROJECTION METHOD, AND STORAGE MEDIUM

CROSS-REFERENCE TO RELATED APPLICATIONS

This application is based upon and claims the benefit of priority under 35 U.S.C. 119 of Japanese Patent Application No. 2020-159510 filed on Sep. 24, 2020, the entire disclosure of which, including the description, claims, drawings, and abstract, is incorporated herein by reference in its entirety.

BACKGROUND

Technical Field

The present disclosure relates to a projection system that includes a projector and a computer, a projection method, and a storage medium.

Description of Related Art

There is known a projector configured to project images in accordance with operations by a user operating his/her computer (e.g., personal computer, tablet). In the known art, in order to know whether the projector is available or is used by other users, the user has to check the projector itself, ask the other potential users whether he/she is using/going to use the projector, or check a projector management table, for example. This inconveniences the user.

SUMMARY

The present disclosure has been made in view of the above issues. The present disclosure provides a projection system, a projection method, and a storage medium that easily and appropriately notify the user whether the projector is available for projecting an image.

According to an aspect of the present disclosure, there is provided a projection system including: a projector configured to project an image on a projection surface; and a computer configured to communicate with the projector and instruct the projector to project the image in accordance with an operation by a user, wherein the projector includes a first processor that sends information on an operation state of the projector to the computer while communicating with the computer, and the computer includes a display and/or a speaker and a second processor that makes a notification based on the information from the projector by causing the display to display a notification and/or by causing the speaker to output a voice.

According to another aspect of the present disclosure, there is provided a projection method that uses a projector configured to project an image on a projection surface and a computer configured to communicate with the projector and instruct the projector to project the image in accordance with an operation by a user, wherein the projector includes a first processor that sends information on an operation state of the projector to the computer while communicating with the computer, and the computer includes a display and/or a speaker and a second processor that makes a notification based on the information from the projector by causing the display to display a notification and/or by causing the speaker to output a voice.

According to another aspect of the present disclosure, there is provided a non-transitory computer-readable storage medium storing: a program that causes a processor of a projector configured to project an image on a projection surface to send information on an operation state of the projector to a computer while communicating with the computer, the computer being configured to communicate with the projector and instruct the projector to project the image in accordance with an operation by a user; and a program that causes a processor of the computer to make a notification based on the information from the projector by causing a display of the computer to display a notification or by causing a speaker of the computer to output a voice.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, one or more embodiments of the projection system according to the present disclosure are described with reference to the drawings. However, the present invention is not limited to the disclosed embodiments.

Figure 1:
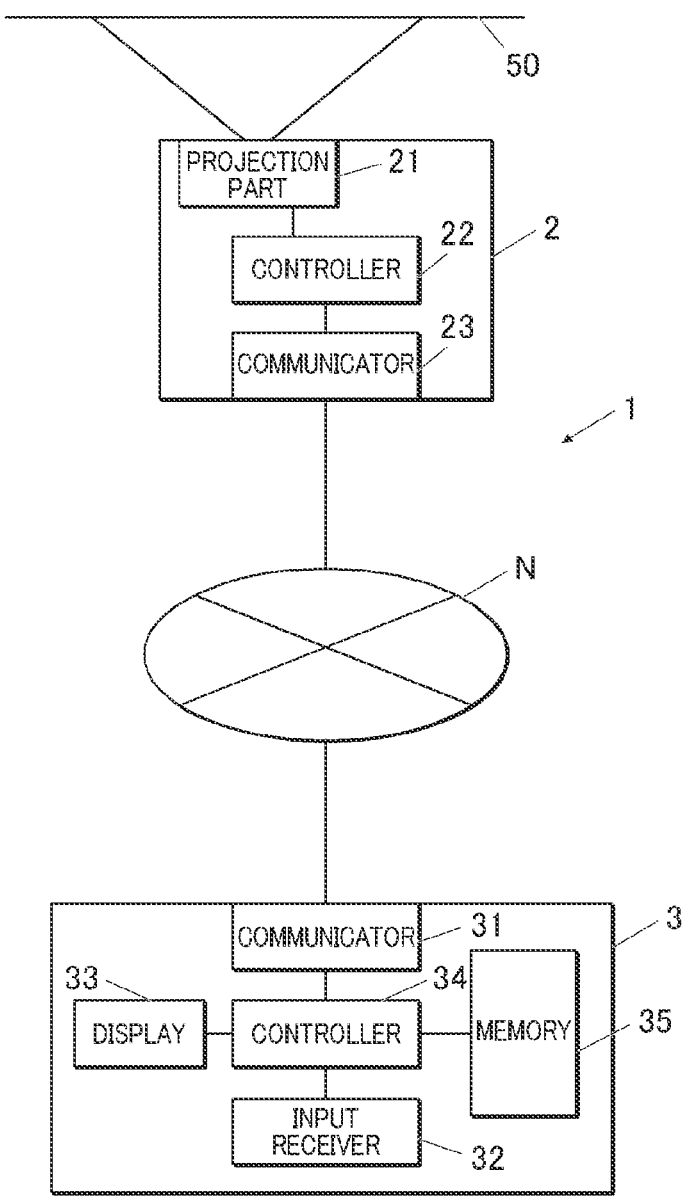
FIG. 1 shows a configuration of a projection system according to an embodiment.

FIG. 1 shows a configuration of the projection system in this embodiment. In this embodiment, the projection system 1 includes a projector 2 and a computer 3 that are connected so as to communicate with each other over a communication network N, such as a wireless local area network (LAN) or a wired LAN.

Figure 4:
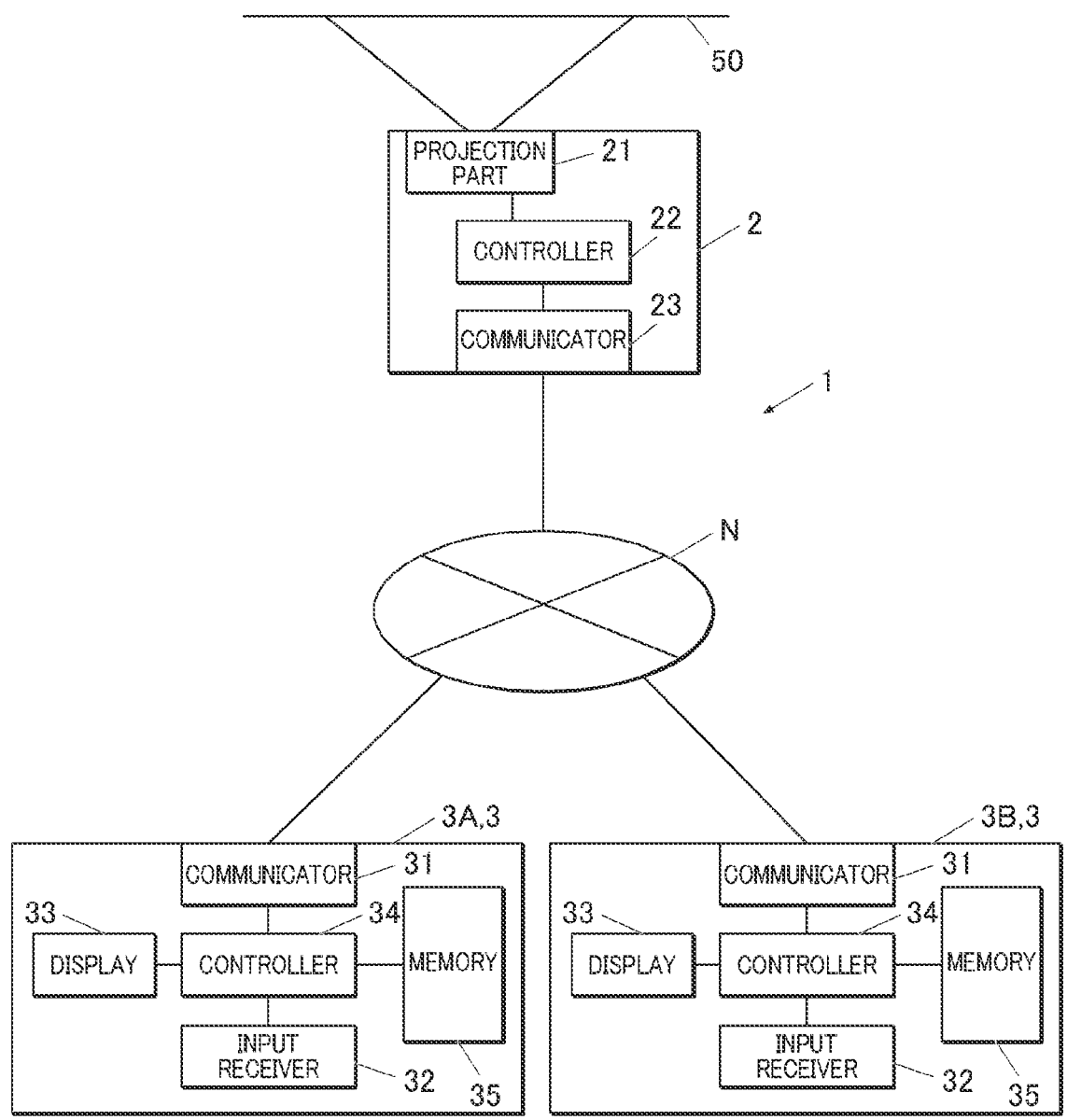
FIG. 4 shows a state where multiple computers are connected to the projector via a communication network.

FIG. 1 shows a case where one computer 3 is connected to the communication network N. However, multiple computers 3 may be connected to the communication network N so as to communicate with the projector 2, as shown in FIG. 4 described later.

The projector 2 includes at least a projection part 21, a controller 22, and a communicator 23. The projection part 21 includes a light source and a optical system, which are not shown. The projection part 21 projects images sent from the computer 3 on the projection surface 50.

The controller 22 consists of, for example, a microcomputer that includes a central processing unit (CPU) as a processor (first processor, not shown). The controller 22 controls the overall operation of the components of the projector 2. When the projector 2 starts communicating with the computer 3, the controller 22 sends information on the operation state of the projector 2 (e.g., the projector 2 is in standby mode or in use (projecting images)) to the computer 3. The detailed process of the controller 22 is described later. The projector 2 further includes a not-shown memory that stores a program for operating the controller 22 and so forth. The controller 22 controls the projector 2 by executing the program stored in the not-shown memory.

The communicator 23 in this embodiment includes a not-shown multimedia CPU so as to communicate with multiple computers 3 over the communication network N wirelessly or through wires. The communicator 23 may not necessarily be a multimedia CPU as long as the communicator 23 can communicate with multiple computers 3.

The computer 3 may consist of a PC, a tablet, or the like. The computer 3 includes at least a communicator 31, an input receiver 32, a display 33, a controller 34, and a memory 35. The communicator 31 includes a not-shown communication module and can communicate with the projector 2 over the communication network N wirelessly or through wires.

The input receiver 32 consists of a keyboard, a mouse, and/or a touch panel, for example. When the user performs an input operation, the input receiver 32 sends signals corresponding to the input operation to the controller 34. The display 33 includes a display screen that consists of a liquid crystal display, an organic electroluminescent display, or the like. The display 33 displays contents sent from the controller 34 on the display screen. The computer 3 may further include a speaker, for example.

The controller 34 includes a not-shown CPU as a processor (second processor). The controller 34 controls the overall operation of functional components of the computer 3. In the present disclosure, the computer 3 is configured to instruct the projector 2 to project an image in accordance with the user's operation. When the user inputs, with the input receiver 32, an instruction to cause the projector 2 to project an image, the controller 34 sends the instruction to the projector 2 via the communicator 31. The detailed process of the controller 34 is described later.

The memory 35 stores, for example, programs for operating the controller 34. The controller 34 controls the computer 3 by executing the programs stored in the memory 35.

In this embodiment, the memory 35 stores image data to be projected by the projector 2 on the projection surface 50. The controller 34 retrieves the image data from the memory 35 and sends the data to the projector 2, as well as instructing the projector 2 to project the image, as described above. The image data can be stored in, for example, a data base separate from the computer 3 and can be retrieved from the database and sent to the projector 2 in accordance with the instruction of the computer 3.

Next, a process that is characteristic of the present disclosure is described. The process is performed by the projector 2 and the computer 3. In the present disclosure, the projector 2 sends information on the operation state of the projector 2 to the computer 3 while communicating with the computer 3. In response to receiving the information from the projector 2, the computer 3 causes the display 33 to display, on its display screen, a notification on whether the projector 2 is available for projecting an image on the projection surface 50. The computer 3 thus notifies the operation state of the projector 2 to the user using the computer 3. The computer 3 may notify the operation state to the user by causing a speaker to output a voice, in addition to or instead of displaying the notification on the display screen. The same applies hereinafter.

The process is described in detail with reference to the flowchart of FIG. 2. The controller 22 of the projector 2 monitors whether the computer 3 communicates with the projector 2 (Step S101). When the computer 3 starts communicating with the projector 2 in accordance with the user's operation (Step S101: YES), the controller 22 sends, to the computer 3, information on the operation state of the projector 2 (e.g., information indicating that the projector 2 is in standby mode or in use (projecting images)) (Step S102).

The communicator 23 of the projector 2 can be kept operative with a minimum power when the projector 2 is turned off and, when the computer 3 communicates with the projector 2, the communicator 23 can send a wake-up signal to the controller 22 to activate the projector 2 into standby mode.

Figure 3A:
FIG. 3A shows an example of contents displayed on the display screen of the computer.
Figure 3B:
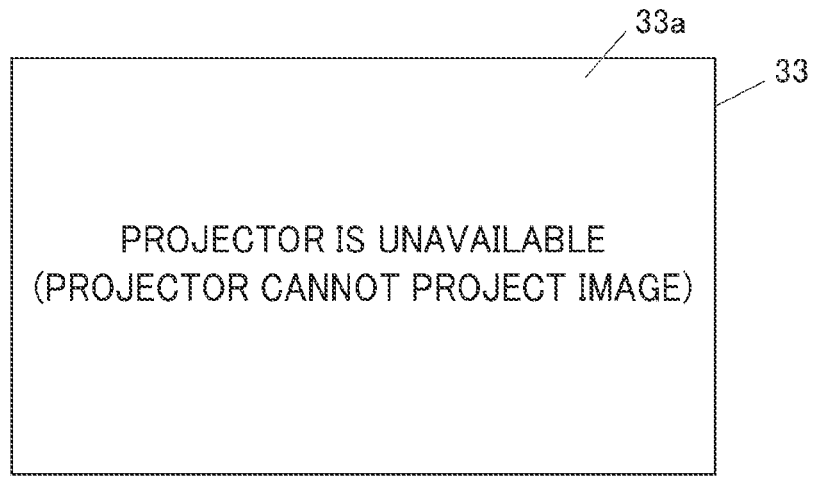
FIG. 3B shows an example of contents displayed on the display screen of the computer.

When the controller 34 of the computer 3 receives information on the operation state from the projector 2 as described above (step S202), the controller 34 executes processing on the basis of the information from the projector 2. More specifically, the controller 34 makes a notification on the basis of the received information (step S203). For example, when the projector 2 is not used by another user and available for projecting an image (the projector 2 may be in standby mode), the display 33 displays a notification that "projector is available" on the display screen 33a, as shown in FIG. 3A. When the projector 2 is used by another user and unavailable for projecting an image in accordance with the instruction of the computer 3, the display 33 displays a notification that "projector is unavailable", as shown in FIG. 3B, for example.

When the projector 2 is configured not to be activated by external operations, the projector 2 does not send the information on its operation state to the computer 3, even when the computer 3 starts communicating with the projector 2 (Step S201). In such a case, the computer 3 can display a notification that "projector is turned off" on the display screen 33a, for example, although not shown.

In this embodiment, the user using the computer 3 is thus notified whether the user can cause the projector 2 to project images by operating the computer 3. The projection system 1 in this embodiment thus allows the user to easily and appropriately recognize whether the user can cause the projector 2 to project images by operating the computer 3 at hand, without directly checking the projector 2.

When the user of the computer 3 waits until the projector 2 becomes available (Step S204: NO), the computer 3 does not send any instruction to the projector 2 (Step S103: NO). Accordingly, the projector 2 repeats the process of Steps S101 and S102. In the flowchart in FIG. 2, until the computer 3 stops communicating with the projector 2, the projector 2 keeps determining "YES" in Step S101 and keeps sending information on the operation state to the computer 3 (Step S102). To save electricity, the projector 2 can be configured to temporarily stop sending the information on the operation state to the computer 3 after firstly sending the information until the operation state changes (e.g., from the unavailable state to the available state).

When the other user ends using the projector 2 and the projector 2 becomes available for projecting images, the contents on the display screen 33a of the computer 3 switch from the content shown in FIG. 3B to the content shown in FIG. 3A, for example. More specifically, when the projector 2 becomes available, the projector 2 sends the information indicating that the projector 2 is available to the computer (Step S102). When receiving the information from the projector 2 (Step S202), the computer 3 notifies the user of the computer 3 that the projector 2 is available for projecting images (Step S203). By being notified by the computer 3, the user can smoothly and easily recognize with the computer 3 that the projector 2 becomes available for projecting images.

When the user of the computer 3 operates the computer 3 to project an image with the projector 2 in response to the notification (Step S204: YES), the controller 34 of the computer 3 instructs the projector 2 to project the image in accordance with the user's operation (Step S205) and sends the data of the image to the projector 2 (Step S206). When the controller 22 of the projector 2 receives the instruction from the computer 3 (Step S103: YES), the controller 22 causes the projector 2 to project the image on the projection surface 50 on the basis of the data sent from the computer 3 (Step S104).

According to the projection system 1 in this embodiment described above, when the user operates the computer 3 to cause the projector 2 to project an image, the user can easily and appropriately recognize with the computer 3 whether the projector 2 is available for projecting images. Further, the projection system 1 in this embodiment can be configured with only the projector 2 and the computer 3 without requiring additional devices, such as a distribution device or control device.

Figure 2:
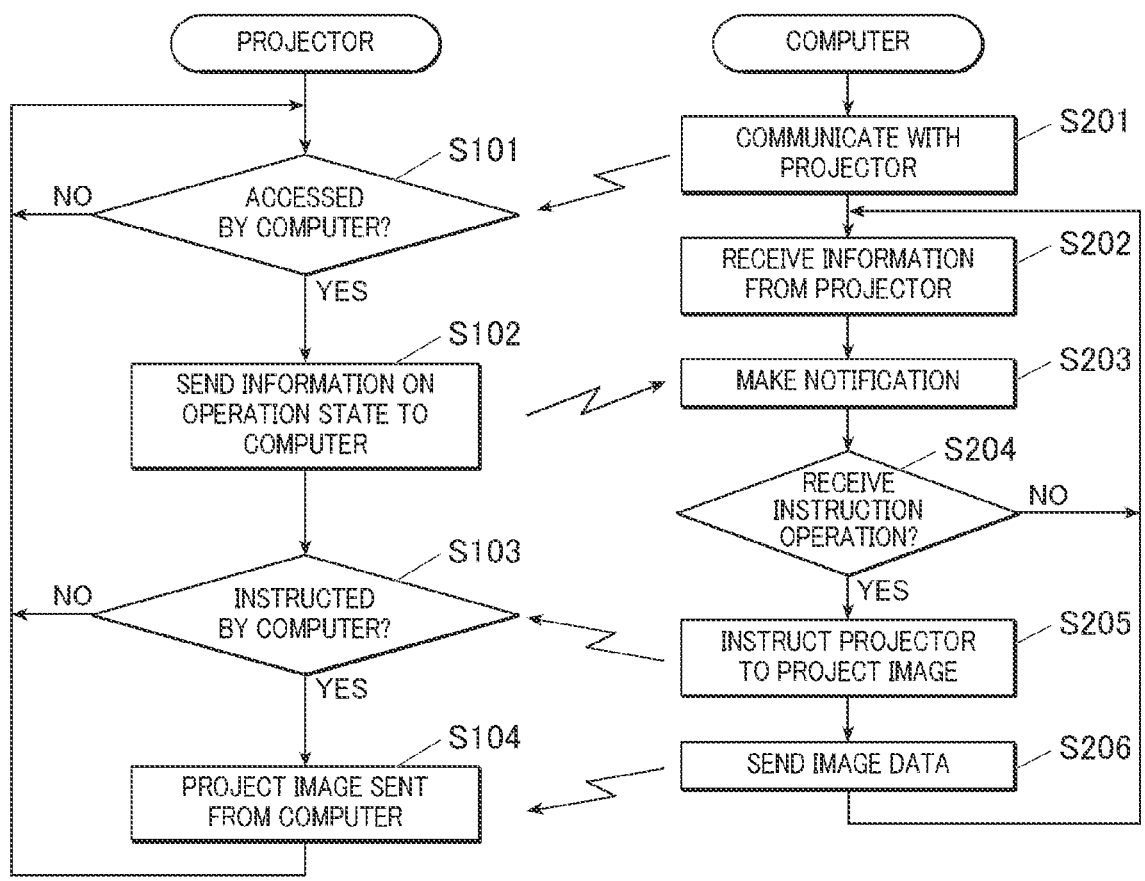
FIG. 2 is a flowchart of a process performed by a projector and a computer.

In the flowchart shown in FIG. 2, when the display screen 33a of the computer 3 displays a notification that the projector 2 is unavailable in Step S203, the user can cause the projector 2 to project an image by operating the computer 3 (Step S204: YES). That is, the user can interrupt another user causing the projector 2 to project images and cause the projector 2 to project images sent from his/her computer 3.

It may be determined as desired whether or not such an interruption at arbitrary timings is acceptable, prohibited, or acceptable only when the other user permits the interruption.

The above embodiment can be variously modified in other ways. For example, as shown in FIG. 4, when multiple computers 3 are connected to the projector 2 over the communication network N so as to communicate with the projector 2, a computer 3B may start communicating with the projector 2 while another computer 3A is instructing the projector 2 to project images. If the user of the computer 3A does not know that the computer 3B has started communicating with the projector 2, the computer 3A may keep using the projector 2 for an unnecessarily long time. Accordingly, the user of the computer 3B may have to wait for a long time until the projector 2 becomes available, for example.

Figure 5:
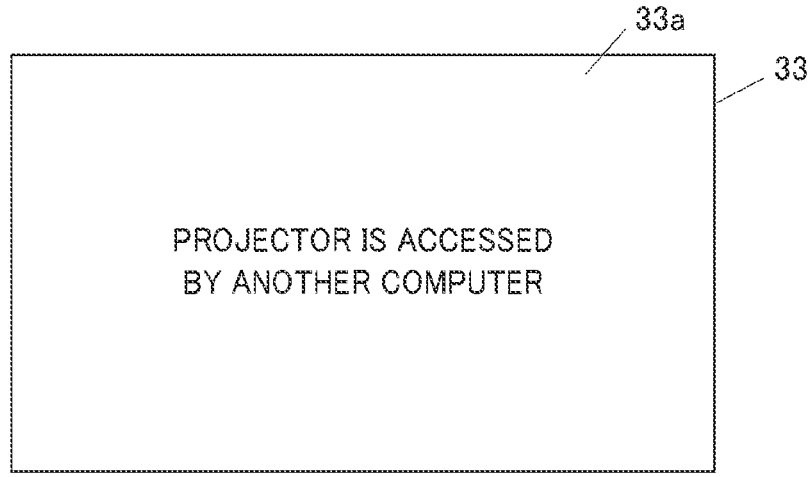
FIG. 5 shows an example of contents displayed on the display screen of the computer.

To deal with this, when the computer 3B starts communicating with the projector 2 while the computer 3A is instructing the projector 2 to project images, the projector 2 can notify the computer 3A that there has been an access from the computer 3B, as shown in FIG. 5. Such a configuration allows the user of the computer 3A to easily and appropriately recognize, on the computer 3A, that there has been an access by the computer 3B and there is a user who wants to use the projector 2. This can prevent the user of the computer 3A from using the projector 2 for an unnecessarily long time and prevent the user of the computer 3B from waiting for an unnecessarily long time.

Figure 6:
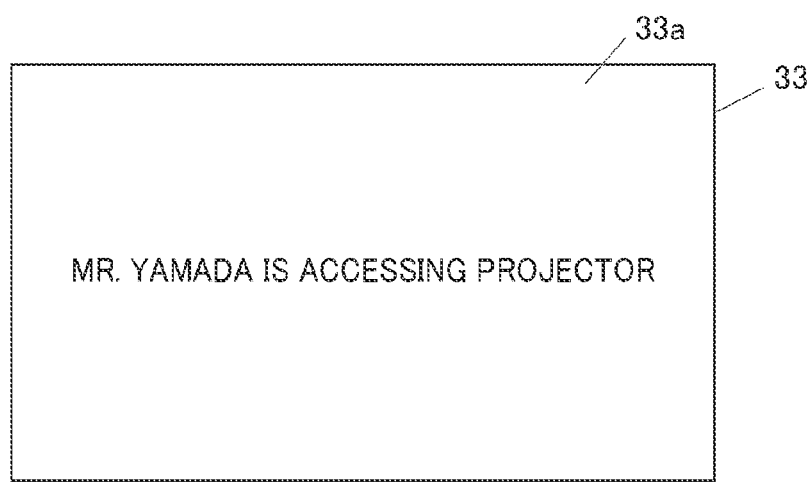
FIG. 6 shows an example of contents displayed on the display screen of the computer.

The projector 2 can notify, to the computer 3A, the user name of the computer 3B as shown in FIG. 6, instead of or in addition to notifying the computer 3A that there has been an access from the computer 3B, for example. In the case, the projection system 100 can be configured such that: the computer 3B sends identification information of the user of the computer 3B (e.g., ID input by the user) to the projector 2 in starting communication with the projector 2; and the projector 2 sends the identification information to the computer 3A. This allows the computer 3A to display the user name of the computer 3B that has started accessing the projector 2.

Figure 7:
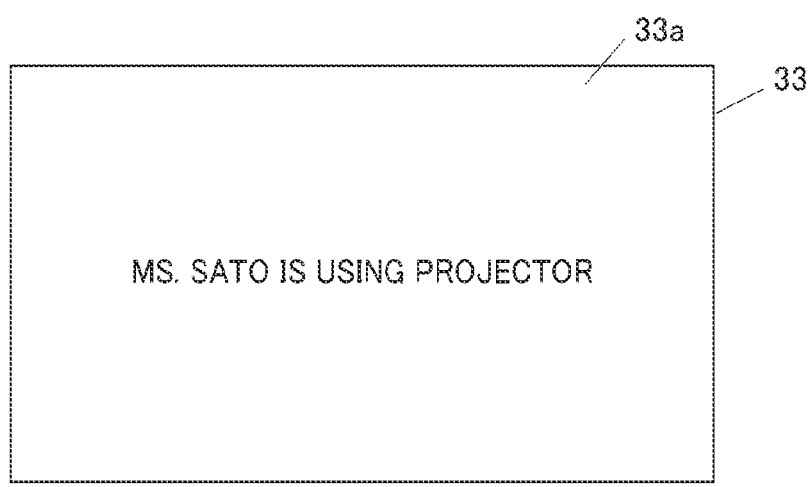
FIG. 7 shows an example of contents displayed on the display screen of the computer.

Similarly, as exemplified in FIG. 7, the projector 2 can notify the user name of the computer 3A, which has already been communicating with the projector 2, to the computer 3B, which has started communicating with the projector 2. Such a configuration allows the user of the computer 3A using the projector 2 to easily and appropriately recognize, with the computer 3A, who has accessed the projector 2. The configuration further allows the user of the computer 3B that has started communicating with the projector 2 to easily and appropriately recognize, with the computer 3B, who is currently using the projector 2.

FIGS. 1 and 4 each show the projection system 1 that has only one projector 2. However, the projection system 1 may have multiple projectors 2. In the case, each computer 3 can communicate with each projector 2 in the way disclosed in the present disclosure.

In the above embodiment, when the computer 3 receives information on the operation state from the projector 2, the computer 3 performs the notification on whether the projector can project images. However, this does not limit the present invention. For example, when the computer 3 (e.g., PC) receives information on the operation state from the projector 2, the computer 3 may transfer the received information to the other terminal (e.g., smartphone, tablet), so that the terminal can notify the user whether the projector 2 is available for projecting images. In one embodiment, the programs described above may be recorded on a non-transitory computer-readable tangible storage medium and provided to the projector 2 or the computer 3 via the storage medium. Examples of the computer-readable storage medium include a nonvolatile memory (e.g., mask ROM and/or a flash memory), another nonvolatile memory (e.g., magneto-resistive random access memory (MRAM)), an HDD, and a portable recording medium (e.g., CD-ROM, a DVD disk). The storage medium, however, is not limited to these examples.

Although some embodiments of the present disclosure have been described, the scope of the present disclosure is not limited to the embodiments described above but encompasses the scope of the invention recited in the claims and the equivalent thereof.

What is claimed is:

1. A projection system comprising:
   a projector configured to project an image on a projection surface; and
   a computer configured to communicate with the projector and instruct the projector to project the image in accordance with an operation by a user, wherein
   the projector includes a first processor that sends information on an operation state of the projector to the computer while communicating with the computer,
   the computer includes
      a display and/or a speaker and
      a second processor that makes a notification based on the information from the projector by causing the display to display a notification and/or by causing the speaker to output a voice,
   the computer includes multiple computers each configured to communicate with the projector, and
   when the projector starts communicating with a first computer of the multiple computers while being instructed to project an image by a second computer of the multiple computers, the first processor notifies the second computer that there has been an access from the first computer.

2. The projection system according to claim 1, wherein in response to receiving the information from the projector, the second processor notifies whether the projector is available for projecting the image.

3. The projection system according to claim 1, wherein
in response to the operation state of the projector being changed from unavailable to available, the first processor sends the information indicating that the projector is available to the computer, and
in response to receiving the information from the projector, the second processor notifies that the projector is available for projecting the image.

4. The projection system according to claim 1, wherein
when the projector starts communicating with a first computer of the multiple computers while being instructed to project an image by a second computer of the multiple computers, the first processor notifies the second computer of a user name of the first computer so as to notify that there has been an access from the first computer.

5. The projection system according to claim 1, wherein the first processor notifies the first computer of a user name of the second computer.

6. A projection method that uses a projector configured to project an image on a projection surface and a computer configured to communicate with the projector and instruct the projector to project the image in accordance with an operation by a user, wherein
the projector includes a first processor that sends information on an operation state of the projector to the computer while communicating with the computer, and the computer includes
a display and/or a speaker and
a second processor that makes a notification based on the information from the projector by causing the display to display a notification and/or by causing the speaker to output a voice
the computer includes multiple computers each configured to communicate with the projector, and
when the projector starts communicating with a first computer of the multiple computers while being instructed to project the image by a second computer of the multiple computers, the first processor notifies the second computer that there has been an access from the first computer.

7. The method according to claim 6, wherein in response to receiving the information from the projector, the second processor notifies the user whether the projector is available for projecting the image.

8. The method according to claim 6, wherein
in response to the operation state of the projector being changed from unavailable to available, the first processor sends the information indicating that the projector is available to the computer, and
in response to receiving the information from the projector, the second processor notifies that the projector is available for projecting the image.

9. The method according to claim 6, wherein
when the projector starts communicating with a first computer of the multiple computers while being instructed to project the image by a second computer of the multiple computers, the first processor notifies the second computer of a user name of the first computer so as to notify that there has been an access from the first computer.

10. The method according to claim 6, wherein the first processor notifies the first computer of a user name of the second computer.

11. A non-transitory computer-readable storage medium storing:
a program that causes a first processor of a projector configured to project an image on a projection surface to send information on an operation state of the projector to a computer while communicating with the computer, the computer being configured to communicate with the projector and instruct the projector to project the image in accordance with an operation by a user; and
a program that causes a second processor of the computer to make a notification based on the information from the projector by causing a display of the computer to display a notification or by causing a speaker of the computer to output a voice,
wherein the computer includes multiple computers each configured to communicate with the projector, and
wherein when the projector starts communicating with a first computer of the multiple computers while being instructed to project an image by a second computer of the multiple computers, the program causes the first processor to notify the second computer that there has been an access from the first computer.

* * * * *